H. A. MYERS.
WEIGHT INDICATING MECHANISM.
APPLICATION FILED OCT. 1, 1919.

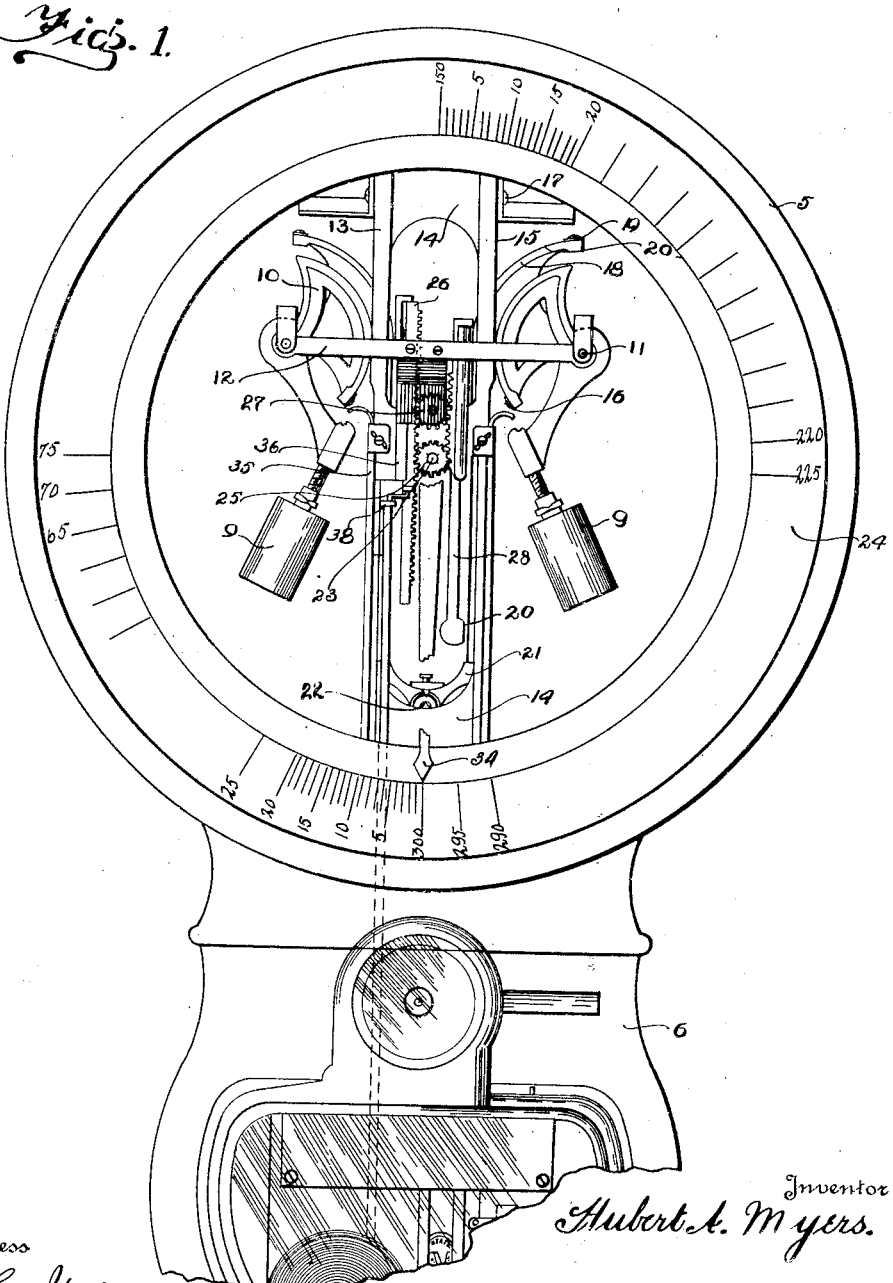

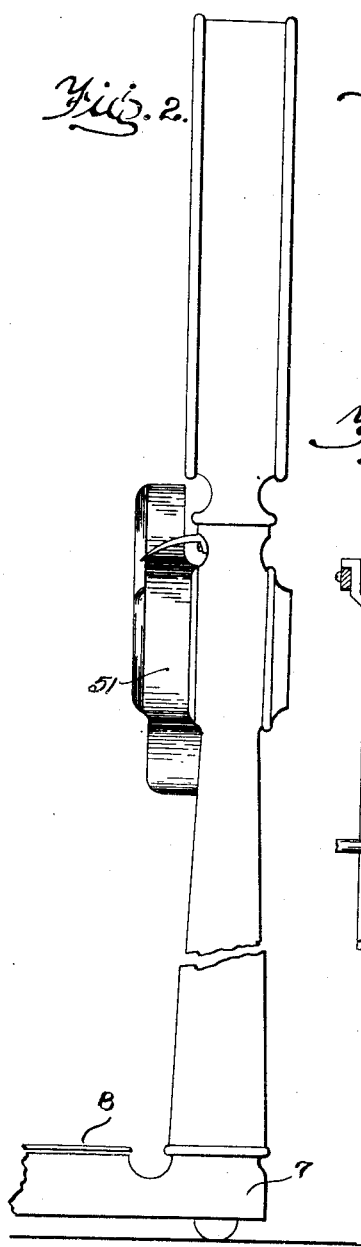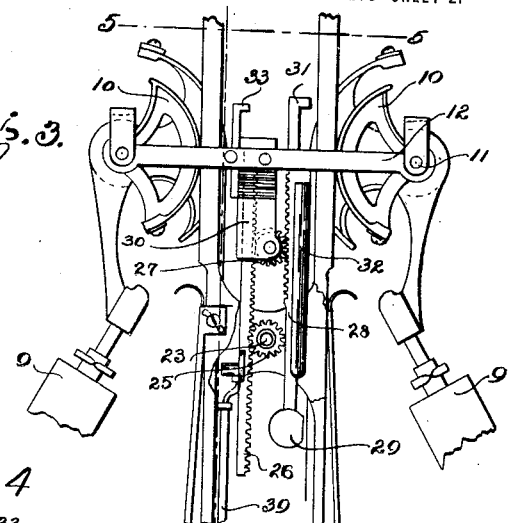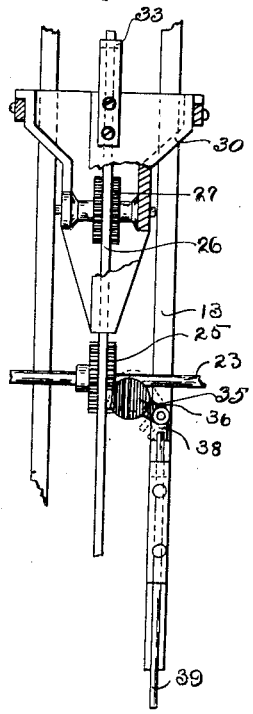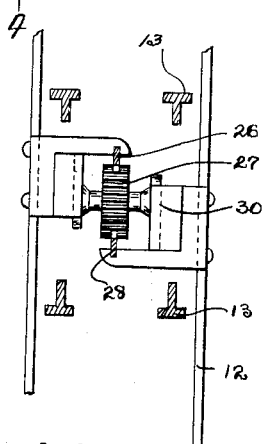

1,433,738.

Patented Oct. 31, 1922.
3 SHEETS—SHEET 3.

Witness
C. E. Wilcox

Inventor
Hubert A. Myers
By George R. Frye
Attorney

Patented Oct. 31, 1922.

1,433,738

UNITED STATES PATENT OFFICE.

HUBERT A. MYERS, OF TOLEDO, OHIO, ASSIGNOR TO TOLEDO SCALE COMPANY, OF TOLEDO, OHIO, A CORPORATION OF NEW JERSEY.

WEIGHT-INDICATING MECHANISM.

Application filed October 1, 1919. Serial No. 327,774.

*To all whom it may concern:*

Be it known that I, HUBERT A. MYERS, a citizen of the United States, residing at Toledo, in the county of Lucas and State of Ohio, have invented certain new and useful Improvements in Weight-Indicating Mechanism, of which the following is a specification.

This invention relates to weighing scales, and more particularly to indicating means which is normally held in locked or inoperative position and is set in motion only upon the operation of some agency other than the weighing mechanism of the scale, such as a coin-operated controlling device or a delayed electrical controlling device.

Among the principal objects of this invention is the provision of a simple, efficient and accurate indicating mechanism particularly adapted for use in scales for the weighing of persons, in which the load-offsetting or counter-balancing mechanism may be of the pendulum type.

Another object is the provision of a weight indicating mechanism which is controlled by an agency other than the weighing mechanism of the scale and which does not interfere with the weighing mechanism of the scale to injuriously affect the accuracy thereof.

Another object is the provision of weight indicating means which at the time the weight is indicated is entirely free from all influence except that of the weighing mechanism of the scale.

Another object is to provide independently-actuated weight indicating mechanism which may be readily substituted for indicating mechanisms now in general use.

With the above and other objects in view which will readily appear as the invention is better understood, my invention consists of the novel construction, combination and arrangement of elements to be hereinafter more fully described, illustrated in the accompanying drawings, and particularly pointed out in the subjoined claims.

Reference is to be had to the accompanying drawings illustrating a preferred embodiment of my invention and in which similar reference characters designate similar parts throughout the several views.

In the drawings:—

Figure 1 is a front elevation of the upper part of a weighing scale equipped with my improved mechanism, portions being broken away showing the indicating means and the pendulum load-offsetting means of the scale in their normal positions;

Figure 2 is a side elevation of the scale, with a part of the column broken out;

Figure 3 is a detail elevation of the pendulum load-offsetting mechanism and the means for operating the indicating mechanism of the scale in an intermediate position.

Figure 4 is a detail section on the line 4—4 of Figure 3, with parts broken away;

Figure 5 is a detail sectional view taken on the line 5—5 of Figure 3; and

Figure 6:
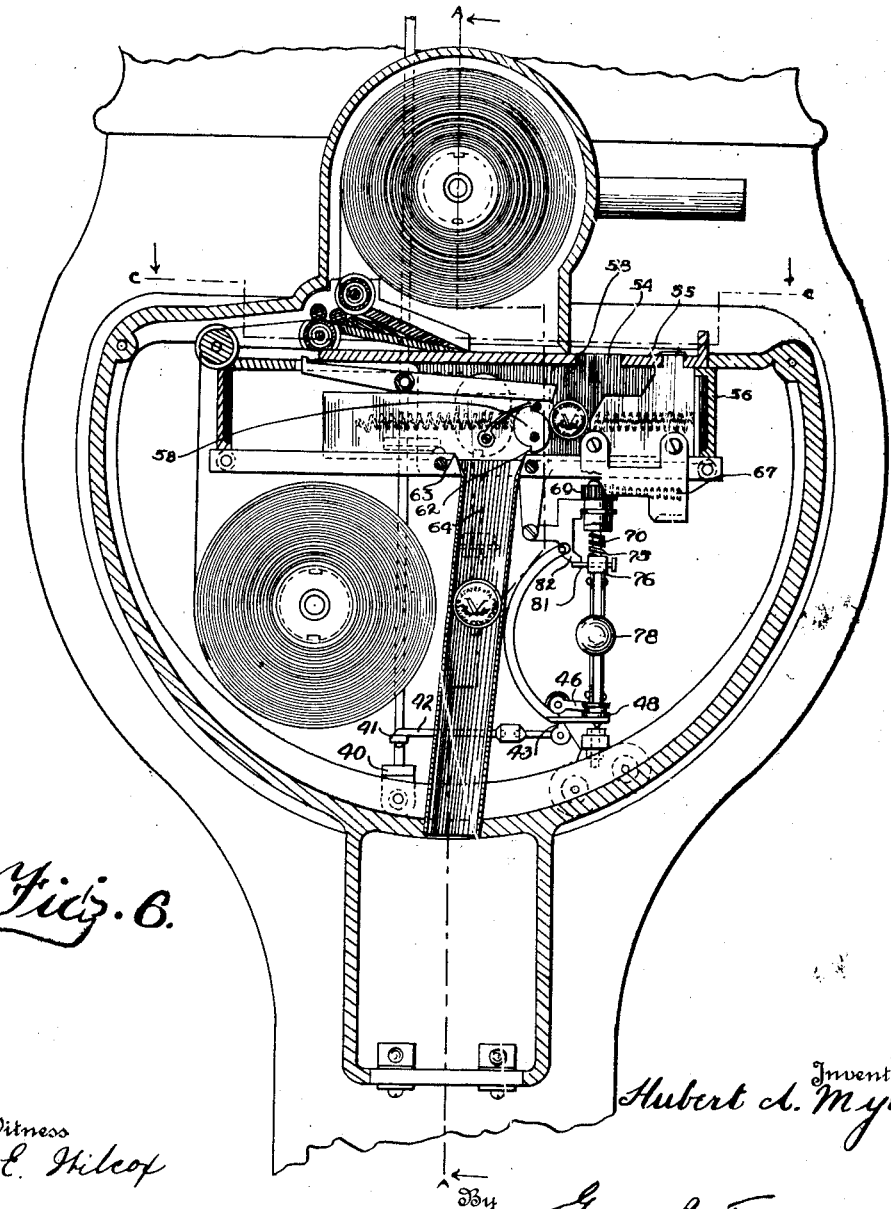
Figure 6 is a front elevation, with parts in section, of a coin-controlled mechanism which may be associated with a scale embodying my weight indicating mechanism.

Referring to the drawings, 5 designates a scale housing adapted to enclose the load-offsetting or counter-balancing mechanism of the scale and supported upon a suitable column 6, the lower end of which is mounted upon the base 7 of the scale which encloses the platform lever mechanism supporting the scale platform 8. It is to be understood that any suitable platform and platform lever mechanism may be employed in connection with the weighing or load-offsetting mechanism of the scale, and the weighing or load-offsetting mechanism may be of any approved type, various mechanisms well known in the scale art being fully capable of performing the required functions. The embodiment herein illustrated is one that has been found to successfully demonstrate the capabilities of this invention, and shows a double pendulum scale of well-known type adapted to be suitably connected to the platform lever mechanism of the scale so that upon the placing of a load upon the scale platform the pendulums will be moved to a certain position counterbalancing the weight of the load. Inasmuch as the present invention is not dependent upon any particular form of scale mechanism, no attempt is made in this application to show a complete scale mechanism nor to delineate the action of the scale in its load-offsetting or weighing operations, only so much of the weighing mechanism being shown as is necessary to clearly portray the operation and co-action of the weight indicating mechanism associated therewith and forming the claimed invention herein disclosed.

As herein shown, the pendulum load-offsetting mechanism comprises a pair of oppositely-disposed pendulums 9, each of which comprises a pair of segments 10 secured upon transverse shafts 11, and the two shafts are connected together by crossbars 12, as clearly shown in Figure 1, the segment shafts 11 and crossbars 12 forming a flexibly-connected rectangular frame connecting the two pendulums. A rectangular frame having four vertical pillars 13 is suitably supported from the wall of the scale housing and secured together at the top and bottom by crosspieces 14. The pillars 13 form bearings or tracks for the rocker segments 10 which have rolling contact thereon, being supported in position by flexible ribbons 15 of steel or other suitable metal fastened to the lower ends of the segments, as at 16, and at their upper ends to the pillars, as at 17, being thus interposed between the pillars and the segments at every position of the latter. Intermediate the members of each pair of supporting segments 10 is a somewhat larger segment 18 which is also fixed, as by dowel pins, to the shaft 11, said segment extending at its periphery between the pillars upon the same side of the rectangular frame and being connected at its upper end, as at 19, to a flexible metallic ribbon 20 which extends over the arcuate face of the segment and is attached at its lower end to an equalizer bar 21. The construction of the two pendulums is substantially identical, and the ribbons 20 are attached to opposite sides of the equalizer bar 21, which is pivotally connected to a link 22 which in turn is suitably connected, as by a steelyard (not shown), to the platform lever mechanism of the scale, the construction being such that whenever a load is placed upon the scale platform a downward pull is exerted upon the equalizer bar 21, which is transmitted through the ribbons 20 to the larger segments 18, causing the swinging of the pendulums so that the pendulum weights are raised to a position counterbalancing the weight of the load on the platform. During the swinging movement of the pendulum to offset the weight of the load, the crossbars 12 are moved vertically upward, and through the medium of this vertical movement of the crossbars the weight indication is effected.

The indicating mechanism of the scale comprises an indicator shaft 23 mounted concentrically of the dial 24 having the weight graduations thereon, and upon the indicator shaft 23 is affixed a pinion 25 adapted to mesh with a vertically-reciprocating rack rod 26 which also meshes with a larger pinion or gear 27 mounted in depending brackets 30 carried by the crossbars 12, and which meshes on the opposite side of its periphery with a vertically-reciprocating rack 28 having a weighted rack-foot 29 at its lower extremity. The weighted rack 28 meshes only with the gear 27 and is formed at its upper extremity with a lateral arm 31 which is adapted to rest upon the upper surface of a bracket 32 when the weighing mechanism is in its normal position, the bracket 32 being secured upon the framework of the scale (see Figures 1 and 3). The reciprocating rack 26 meshes with both the pinion 25 on the indicator shaft and with the larger pinion 27 carried by the crossbars 12 and when the weighing mechanism of the scale is in its normal position the upper surface of the rack 26 is contacted by the lateral arm 33 of an upwardly-extending bracket carried by the crossbars 12. The indicator hand 34 is suitably secured upon the forward extremity of the indicator shaft 23 in the usual manner.

The indicating mechanism above described is so constructed and connected that no indication will be given upon the operation of the weighing mechanism of the scale because of the locking of the indicating mechanism by the locking and releasing mechanism now to be described. A brake 35 (see Figures 1 and 4) is pivotally mounted upon a bracket 36 secured upon one of the pillars 13 of the scale, and this brake is formed as a bellcrank lever, the lower arm of which is connected for oscillation with the crank or eccentric arm 38 formed at the upper end of the brake rod 39, the lower end of which extends below the housing 5 of the scale into the upper portion of the column 6, the lower extremity being supported upon a bracket 40 secured to said column, as shown in Figure 6. The normal position of the brake 35 is shown in full lines in Figures 1 and 4 and the arrangement is such that upon the rotation of the brake rod 39 the lower arm of the bellcrank lever is swung into the position shown in dotted lines in Figure 4, lifting the brake out of contact with the rack 26 upon which the head of the brake bears when the weighing mechanism is in normal position. An apertured lug extending from the bracket 36 forms a guide for the upper end of the brake rod 39.

Although the brake 35 may be released by any suitable mechanism, I have shown it as operated by a coin-controlled device. Since this device is described and claimed in my co-pending application Ser. No. 327,773, filed October 1, 1919, I will here describe it in general terms only. The coin-controlled mechanism is enclosed within the housing 51, of substantially the shape shown in Figures 2 and 6, and adapted to be secured upon the forward portion of the column 6. As shown in Figure 6, a slot 54 for the insertion of a coin or check is located in the upper plate 55 of a slidable coin-carrying mechanism, which is mounted for reciprocating movement within the frame 56 carried by the housing 51. The coin is retained in the coin-carrying mechanism by means of an irregularly shaped baffle plate 58 pivoted eccentrically upon a pin mounted in the opposite side walls of the slidable mechanism. At its lower extremity the baffle plate 58 is formed with a shoulder 62, as shown, to contact with an upwardly-extending lug 63 upon the base of the supporting frame 56 as the slidable frame approaches its limit of movement, the lug 63 being positioned to engage the shoulder and thus rotate the baffle plate to allow passage of the coin into the coin chute 64.

A horizontal rack 67 secured to the coin-carrying mechanism meshes with a pinion 69 loosely surrounding the vertical shaft 70 and so arranged that the rotation of the pinion winds up a spring 75 surrounding said shaft, the lower end of which spring is connected to a collar 76 which is fixed on the shaft 70. Connected to the collar 76 is a pair of toggle-carried fly balls 78. A pin 81 carried by the collar 76 engages a member 82 and serves to hold the collar against rotation until the slidable coin-carrying mechanism approaches its limit of movement, whereupon the pin is released and the toggle-carried fly balls allowed to rotate under the influence of the spring 75. Outward movement of these balls, due to centrifugal force, elevates the sleeve 48, thereby rocking the arms 46 and 43 and acting through the link 42 and arm 41 to rock the brake rod 39 to swing the brake 35 out of contact with the rack 26.

The operation of the weight indicating mechanism so far described with relation to the scale mechanism will now be given. When a weight is placed on the platform 8 of the scale the pendulums 9 are swung upwardly to a position offsetting the weight on the platform, the crossbars 12 connecting the pendulums being moved upwardly in accordance with the displacement of the pendulums, carrying the arm 33 of the upwardly-extending bracket secured to the crossbars 12 a distance above the upper end of the rack 26 proportional to the displacement of the pendulums. The larger pinion 27 mounted in the bracket upon said crossbars is also carried upwardly therewith, but since the rack 26 is firmly clamped in position by means of the brake 35, the upward movement of the pinion 27 will not carry with it this rack 26. Instead, the teeth of the rack 26 act as a cog-rail or track upon which the pinion 27 rolls upwardly, lifting the weighted rack 28 with which the pinion 27 also meshes. The rack 28 is therefore moved upwardly a distance proportional to the displacement of the crossbars 12, which, of course, is governed by the displacement of the pendulums 9 in counterbalancing the weight on the scale platform. Thus, while the weight on the platform is counterbalanced by the weighing mechanism of the scale, the indicating mechanism does not indicate until after the brake 35 is detached from its engagement with the rack 26, the indicating mechanism being actuated in this instance by operation of a coin-controlled device. When the rack 26 is released it moves upwardly until its upper portion contacts with the laterally-extending arm 33 of the bracket upon the crossbar 12, rotating in its upward movement the pinion 25 so as to swing the indicator hand 34 to its proper position indicating on the dial 24 the weight on the platform. The upward movement of the rack 26 is accomplished by reason of the fact that when the brake 35 is released the weighted rack 28 descends by gravity from its elevated position, rotating during its downward movement the larger pinion 27, which also meshes with the rack 26, the rotation of this pinion being communicated to the rack 26 to move it in the opposite direction. As soon as the weight is removed from the platform the pendulums 9 fall by gravity to their original positions, allowing the bracket 36, pinion 27, and racks 26 and 28 to descend to the position shown in Figure 1. The downward movement of the rack 26 returns the pinion 25 and indicator hand 24 to their original positions. As soon as the fly ball mechanism has ceased rotating, the sleeve 48 is lowered by virtue of the inward movement of the weights 78, the lowering of the sleeve 48 serving to rock the arms 46, 43 and 41 and rotate the brake rod 39, thereby again swinging the brake 35 into contact with the rack 26.

While it will be apparent that the illustrated embodiment of my invention herein disclosed is well calculated to adequately fulfill the objects primarily stated, it is to be understood that the invention is susceptible to variation, modification and change within the spirit and scope of the subjoined claims.

Having described my invention, I claim:

1. In a device of the character described, the combination with the weighing mechanism, of independently-actuated indicating mechanism governed in its extent of movement by the weighing mechanism, said indicating mechanism including an indicator hand, an indicator shaft upon which the indicator hand is mounted, a pinion fixed on said shaft, a vertically-movable rack meshing with said pinion movable with said weighing mechanism, a larger pinion also meshing with said rack, and a second rack meshing with said larger pinion and adapted to move in the opposite direction to the first-mentioned rack.

2. In a device of the character described, the combination with the weighing mechanism, of indicating mechanism operated independently of the weighing mechanism and governed in its extent of movement by the weighing mechanism, said indicating mechanism comprising a pair of vertically-movable racks, a pinion meshing with both of said racks and movable in opposite directions, a second pinion movable with said weighing mechanism meshing with one of said racks, and an indicator hand rotatable with said second pinion.

3. In a device of the character described, the combination with the weighing mechanism, of indicating mechanism operated independently of the weighing mechanism and governed in its extent of movement by the weighing mechanism, said indicating mechanism comprising a pair of vertically-movable racks, a pinion meshing with both of said racks and movable with said weighing mechanism, a smaller pinion meshing with one of said racks, an indicator hand rotatable with the smaller pinion, means for locking one of said racks in inoperative position, and means for releasing the locking means.

4. In a device of the character described, the combination with the weighing mechanism, of indicating mechanism operated independently of the weighing mechanism and governed in its extent of movement by the weighing mechanism, said indicating mechanism comprising a pair of vertically-movable racks, a stop carried by the weighing mechanism to limit the movement of one of said racks, a pinion meshing with both of said racks and movable with said weighing mechanism, a smaller pinion meshing with one of said racks, and an indicator hand rotatable with the smaller pinion.

5. In a device of the character described, the combination with the weighing mechanism, indicating mechanism operated independently of the weighing mechanism and governed in its extent of movement by the weighing mechanism, said indicating mechanism comprising a pair of vertically-movable racks, means for normally locking one of said racks, a pinion meshing with both of said racks and movable with said weighing mechanism, a smaller pinion meshing with one of said racks, an indicator hand rotatable with the smaller pinion, and means for releasing the locking means.

6. In a device of the character described, a pair of pendulums, crossbars connecting the pendulums, brackets carried by said crossbars, a pinion mounted in said brackets, a pair of vertically-movable racks meshing with said pinion, a smaller pinion meshing with one of said racks, and an index hand rotatable with the smaller pinion.

7. In a device of the character described, a pair of pendulums, crossbars connecting the pendulums, brackets carried by said crossbars, a pinion mounted in said brackets, a pair of vertically-movable racks meshing with said pinion, a stop carried by the crossbars and normally engaging one of said racks, a smaller pinion meshing with one of said racks, and an index hand rotatable with the smaller pinion.

8. In a device of the character described, a pair of pendulums, crossbars connecting the pendulums, brackets carried by said crossbars, a pinion mounted in said brackets, a pair of vertically-movable racks meshing with said pinion, a stop carried by the crossbars and normally engaging one of said racks, a weighted rack-foot carried by the other of said racks, a smaller pinion meshing with one of said racks, and an index hand rotatable with said smaller pinion.

9. In a device of the character described, the combination of weighing mechanism, independently-actuated indicating mechanism governed in its extent of movement by the weighing mechanism, including a vertically-movable rack, and means for moving said rack upwardly to cause the weight of a load to be indicated, and means for normally holding the indicating mechanism in inoperative position, including a brake arranged to contact with said rack and means for releasing said brake.

10. In a device of the character described, the combination of weighing mechanism, independently-actuated indicating mechanism governed in its extent of movement by the weighing mechanism, including a vertically-movable rack, and means for moving said rack upwardly to cause the weight of a load to be indicated, means for normally holding the indicating mechanism in inoperative position, including a brake arranged to contact with said rack, and mechanism for releasing the brake from engagement with the rack.

11. In a device of the character described, the combination of weighing mechanism, independently-actuated indicating mechanism governed in its extent of movement by the weighing mechanism, including a vertically-movable rack and means for moving said rack upwardly to cause the weight of a load to be indicated, means for normally holding the indicating mechanism in inoperative position, including a brake arranged to contact with said rack, a brake rod for throwing said brake, and mechanism associated with said brake rod for actuating the latter to release the brake from engagement with said rack.

12. In a device of the character described, the combination of weighing mechanism, independently-actuated indicating mechanism governed in the extent of movement by the weighing mechanism, including a vertically-movable rack, means for normally holding the indicating mechanism in inoperative position, including a pivotally-mounted brake arranged to contact with said rack, a brake rod having an offset arm connected with said brake, and means connected with the brake rod for moving the brake rod to oscillate said arm.

13. In a device of the character described, the combination of weighing mechanism, independently-actuated indicating mechanism governed in the extent of movement by the weighing mechanism, including a vertically-movable rack, means for normally holding the indicating mechanism in inoperative position, including a pivotally-mounted brake arranged to contact with said rack, a brake rod having an offset arm connected with said brake, means connected with the brake rod for moving the brake rod to oscillate said arm, including a rock-shaft, a link connecting the rock-shaft with the brake rod, and mechanism for rocking said shaft.

14. The combination in a scale, of weighing mechanism, indicating means, a rack, a pinion carried by said weighing mechanism and movable along said rack when said weighing mechanism moves to weighing position, means for rotating said pinion to move said rack, and a second pinion meshing with said rack and connected to said indicating means.

15. The combination in a scale, of weighing mechanism, indicating means, a rack, a pinion carried by said weighing mechanism and movable along said rack when said weighing mechanism moves to weighing position, means for rotating said pinion to move said rack, a stop positioned by said weighing mechanism to limit the movement of said rack, and a second pinion meshing with said rack and connected to said indicating means.

16. The combination in a scale, of weighing mechanism, indicating means, a rack, a lock to hold said rack against movement, a pinion carried by said weighing mechanism and movable along said rack when said weighing mechanism moves to weighing position, means to release said lock, means for rotating said pinion to move said rack, and a second pinion meshing with said rack and connected to said indicating means.

17. The combination in a scale, of weighing mechanism, indicating mechanism, a weighted member, said weighted member and indicating mechanism being differentially connected to said weighing mechanism, means for locking said indicating mechanism against movement whereby movement of said weighing mechanism will result in multiplied movement of said weighted member, and means for subsequently releasing said locking means.

18. The combination in a scale, of weighing mechanism, a pair of members differentially connected thereto, an indicator connected to one of said members, means for holding said member against movement, means tending when the other of said members is moved to return it to its original position, and means for releasing said holding means.

19. The combination in a scale, of weighing mechanism, a pair of racks, differentially connected thereto, an indicator connected to one of said racks, means for holding said rack against movement, means tending when the other of said racks is moved to return it to its original position, and means for releasing said holding means.

20. The combination in a scale, of weighing mechanism, a pair of racks differentially connected thereto, an indicator connected to one of said racks, means for holding said rack against movement, a weight tending when the other of said racks is moved to return it to its original position, and means for releasing said holding means.

21. The combination in a scale, of weighing mechanism, a pair of members differentially connected thereto, an indicator connected to one of said members, means for holding said member against movement, means for releasing said holding means, and means operated upon such release to return said members to their original positions relative to each other.

22. The combination in a scale, of weighing mechanism, a pair of racks differentially connected thereto, an indicator connected to one of said racks, means for holding said rack against movement, means for releasing siad holding means, and means operable upon such release to return said racks to their original positions relative to each other.

HUBERT A. MYERS.

Witnesses:
C. E. WILCOX,
D. MARSHALL.